United States Patent [19]
Gilbert et al.

[11] Patent Number: 6,036,745
[45] Date of Patent: Mar. 14, 2000

[54] MOLTEN METAL CHARGE WELL

[75] Inventors: Ronald E. Gilbert, Chardon; Chris T. Vild, Cleveland Hts.; Richard S. Henderson, Solon; Mark A. Bright, Maple Hts., all of Ohio

[73] Assignee: Metaullics Systems Co., L.P., Solon, Ohio

[21] Appl. No.: 08/784,832

[22] Filed: Jan. 17, 1997

[51] Int. Cl.$^7$ .................................................. C22B 21/00
[52] U.S. Cl. ............................ 75/686; 266/45; 266/233; 266/275
[58] Field of Search ...................... 266/233, 216, 266/900, 901, 275, 45; 52/608, 596; 75/686, 687; D25/113, 116

[56] References Cited

U.S. PATENT DOCUMENTS

| | | |
|---|---|---|
| 4,286,985 | 9/1981 | Van Linden et al. . |
| 4,322,245 | 3/1982 | Claxton . |
| 4,598,899 | 7/1986 | Cooper . |
| 4,747,583 | 5/1988 | Gordon et al. . |
| 5,135,202 | 8/1992 | Yamashita et al. ..................... 266/233 |
| 5,350,440 | 9/1994 | Katyal et al. .............................. 75/687 |
| 5,435,527 | 7/1995 | Margaria ................................. 266/216 |

FOREIGN PATENT DOCUMENTS 0 030 220 A2  12/1988  European Pat. Off. .

*Primary Examiner*—Scott Kastler
*Attorney, Agent, or Firm*—Fay, Sharpe, Fagan, Minnich & McKee, LLP

[57] ABSTRACT

In a charge well for adding scrap metal pieces or particles to a molten metal bath, a stationary diverter is provided within a charge well for diverting the circular flow of molten metal, caused by the orientation of the inlet port, in a downward direction, thereby creating a downward flow of molten metal which results in quick and efficient submergence of incoming lightweight scrap metal pieces or particles. Preferably, the diverter includes a leading edge which extends in a generally radial direction within the charge well and a flat top surface which tapers from the leading edge to a point or narrowed trailing edge. A downward curved surface extends from the leading edge to facilitate the downward flow of molten metal. The diverter may be mounted on a support member extending above the charge well.

22 Claims, 5 Drawing Sheets

MOLTEN METAL CHARGE WELL

BACKGROUND OF THE INVENTION

The invention relates to apparatus for metal refining and is directed to an improved molten metal charge well for melting solid metal pieces into a molten metal bath. The invention is particularly applicable to aluminum refining.

In the secondary or scrap metal industry, metal refining apparatus typically include a large furnace which provides molten metal to a charge well, where scrap metal pieces or particles are added to the molten metal. A molten metal pump is provided for conveying the molten metal from the furnace to the charge well. From the charge well, the metal flows into a skim well where impurities are removed prior to reintroduction of the metal to the furnace. The molten metal in the charge well typically includes a skim and dross layer on top which insulates the molten metal from the atmosphere. In this way, scrap metal may be melted while the generation of metal oxides, which are detrimental to the refining process, is prevented or reduced.

With lightweight metals such as aluminum scrap metal, which have a high surface area to weight ratio, there is a tendency for the metal particles to float on top of the molten metal in the charge well. Moreover, the molten metal has a high surface tension which results in large buoyant forces. Floating scrap metal is undesirable because it remains exposed to the atmosphere for a sufficient period of time while being heated by the underlying molten metal that the formation of oxides and the introduction of other impurities often results.

It is known to provide a rotatable impeller within the charge well to facilitate the submergence of the incoming scrap metal pieces. Such devices are disclosed, for example, in U.S. Pat. Nos. 4,598,899 and 4,322,245, which are incorporated herein by reference. One problem with such devices, however, is that the impeller motion often results in the formation of a vortex that is sufficient to draw surrounding atmospheric gases into the molten metal. Such devices are often complex and costly to manufacture and maintain and their maintenance may result in significant down time.

It would therefore be desirable to provide a device for facilitating the introduction of scrap metal into the molten metal bath in the charge well without the attendant disadvantages of the prior art devices. Accordingly, it is an object of the invention to provide a charge well configuration which permits the facile and efficient introduction of scrap metal pieces into the molten metal bath with a minimization of melt loss.

A variety of charge well constructions were evaluated by the applicants. Four vortex wells were water modeled at a ⅚ scale in the laboratory. The key desirable parameters of the designs include: a) facile submergence for quick melting (heat transfer) and high feed rates; and b) a relatively calm surface of the molten metal bath for minimization of dross formations in a molten aluminum application. In Test 1, molten metal was directed tangentially into a cylindrical charge well and removed in a tangential direction to establish a vortex. In Test 2, molten metal was directed tangentially into a bowl-shaped charge well via a somewhat restrictive conduit which established a relatively high pressure flow. In this case the molten metal entered near the top of the charge well and was withdrawn at the base. With reference to Test 3, molten metal was provided to the charge well via an upwardly sloped relatively wide diameter conduit which did not provide a pressure increase of the magnitude achieved by the conduit in Test 2. Again, the molten metal was withdrawn from the base of the charge well. Test 4 used a molten metal conduit similar to that utilized in Test 3. However, a flow diverter was inserted into the charge well to achieve a downward flow of molten metal within the generally circular flow created by the tangential inlet.

As the results of the evaluations indicate, relative to the other tests, the pressure of a downward flow diverter decreased the time required to submerge 50 plastic sticks and expel 90% of them relative to the other tests. It is significant to note that this improvement over even Tests 1 and 2 occurred with an inlet ramp and outlet design resembling that of Test 3 which was unable to discharge any sticks.

The flow diverter of Test 4 was comprised of a wedge-shaped body having an arcuate downward facing surface directing flow downward. The body also includes a relatively wide leading edge which tapers to a narrow trailing edge.

SUMMARY OF THE INVENTION

The invention addresses the disadvantages of the prior art by providing a charge well configuration which facilitates the submergence of incoming scrap metal using a simple and inexpensive implement. Particularly, the invention provides a stationary diverter, baffle or wing, etc., within the charge well for diverting the circular flow of molten metal, caused by the orientation of the inlet port, in a downward direction, thereby creating a downward flow of molten metal which results in quick and efficient submergence of incoming lightweight scrap metal pieces or particles. Preferably, the diverter includes a leading edge which extends in a generally radial direction within the charge well and a flat top surface which tapers from the leading edge to a point or narrowed trailing edge. A downward curved surface extends from the leading edge to facilitate the downward flow of molten metal.

BRIEF DESCRIPTION OF THE DRAWING FIGURES

The invention may take physical form in certain parts and arrangements of parts, a preferred embodiment of which will be described in detail in this specification and illustrated in the accompanying drawings which form a part hereof, wherein.

DETAILED DESCRIPTION OF THE PREFERRED EMBODIMENT(S)

Figure 1:
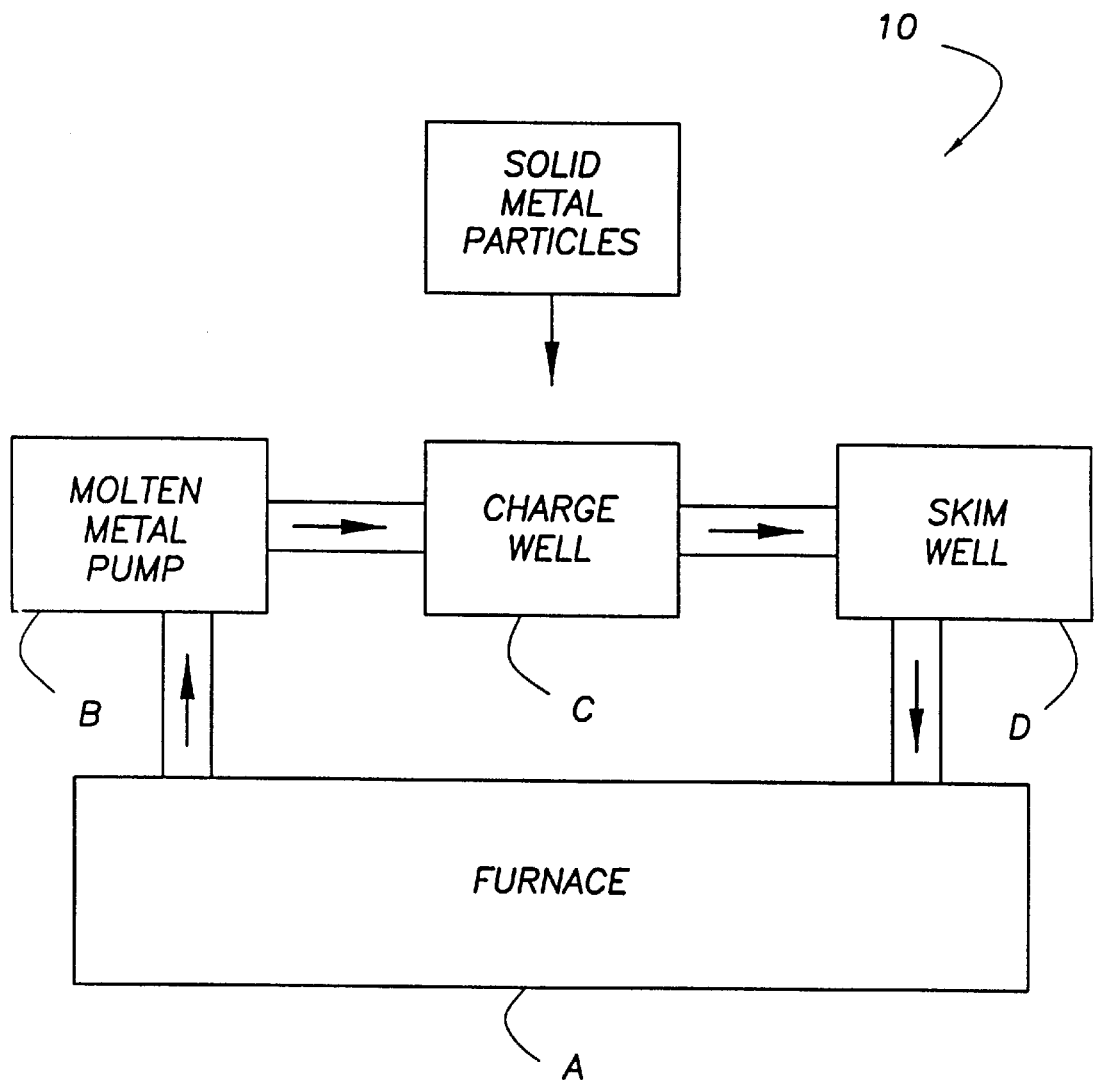
FIG. 1 is a schematic diagram illustrating the component parts of an aluminum refining apparatus according to the present invention.

Referring to FIG. 1, there is illustrated generally an apparatus for melting solid metal scrap pieces. The apparatus, generally referenced 10, is comprised of a furnace A, molten metal circulation pump B, charge well C, and skim well D. In operation, furnace A provides molten metal via circulation pump B to charge well C. Solid metal particles are introduced into the molten metal in the charge well C. The molten mixture then flows into a skim well D where the dross, skim and impurities are removed before the molten metal is reintroduced into furnace A. This general operation is known in the art.

Figure 2:
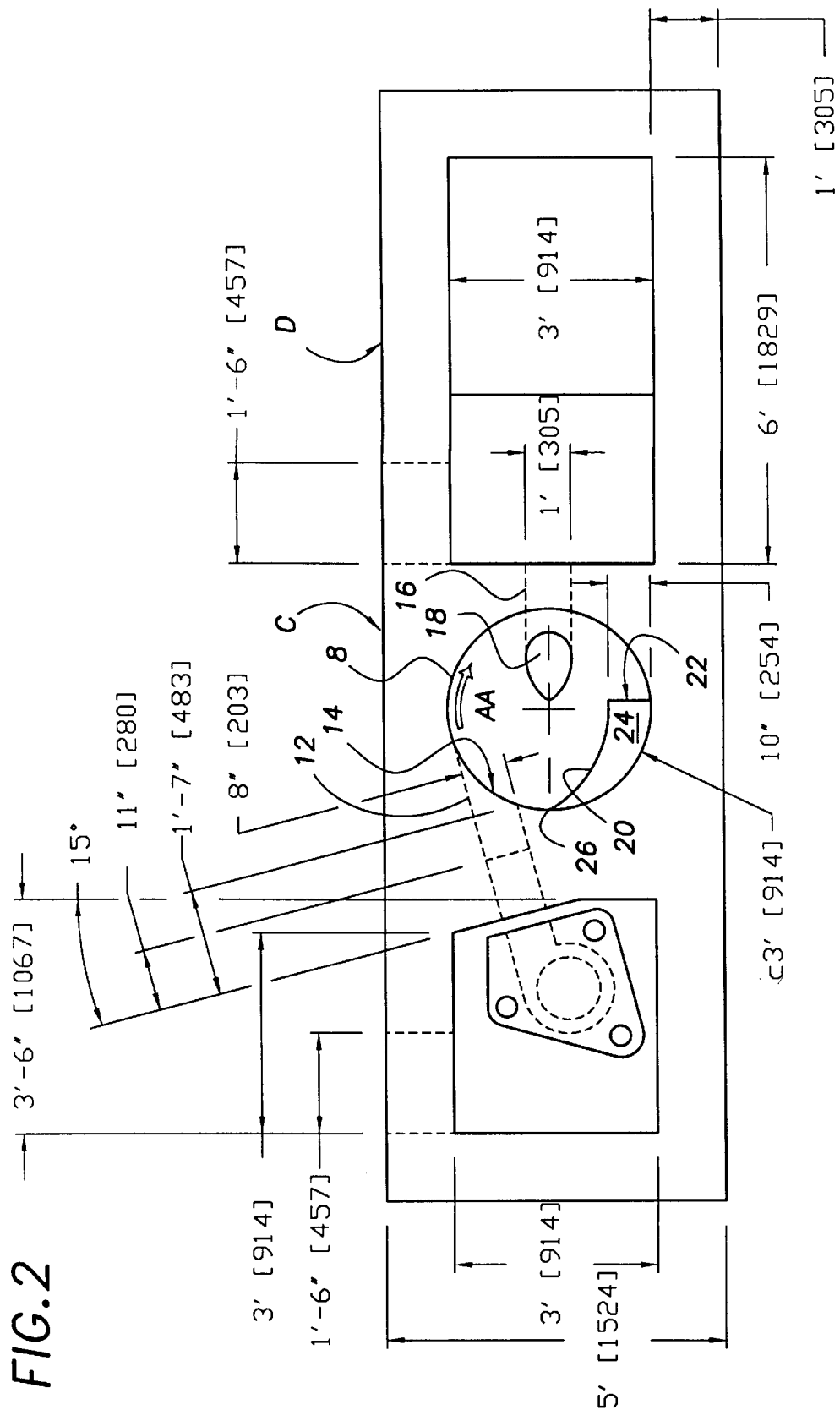
FIG. 2 is a top view of a charge well according to a preferred embodiment of the invention.
Figure 3:
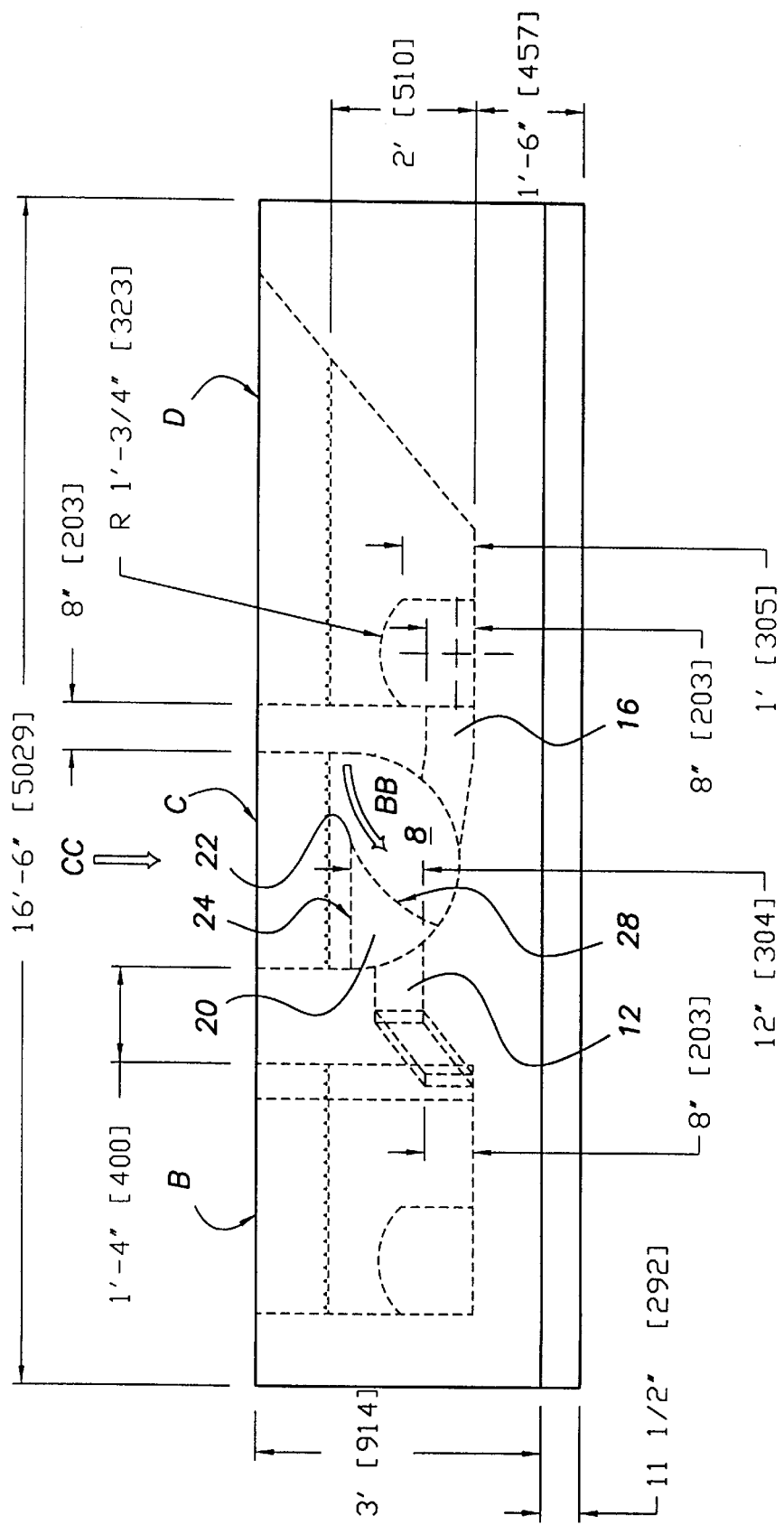
FIG. 3 is a front view of a charge well according to a preferred embodiment of the invention.

With reference to FIG. 2 and FIG. 3, a charge well C according to a preferred embodiment of the present invention is illustrated in top and front views, respectively. Charge well C comprises a generally bowl-shaped receptacle 8 which is constructed primarily of a refractory material and provided with an inlet conduit 12 and inlet port 14, as well as an outlet conduit 16 and outlet port 18. It will be recognized that the invention is applicable to different charge well shapes, such as cylindrical and/or flat bottom shapes. Inlet conduit 12 receives the molten metal from circulation pump B and conveys the molten metal to the charge well with a tangential flow such that the molten metal circulates in a clockwise direction as indicated by arrow AA. The outlet port 18 is located at or near the bottom center of the bowl-shaped receptacle. Thus, the flow of molten metal proceeds from the inlet port 14 near the top of the bowl in a clockwise spiral downward to the center of the bowl. This results in a vortex flow pattern. Outlet port 18 and outlet conduit 16 convey the molten metal from charge well C to skim well D.

In accordance with the present invention, a diverter 20, made primarily of refractory material, is provided in charge well C for diverting the molten metal flow downward within the charge well C. Preferably, diverter 20 includes a leading edge 22 which first encounters the vortex flow. Leading edge 22 defines a generally planar top surface 24 which tapers to a narrow trailing edge 26. Preferably, leading edge 22 is placed at a position of about 270 degrees from the inlet port 14. Trailing edge 26 is depicted as a point in FIG. 2 and extends into the plane of the drawing. As is apparent, leading edge 22 and trailing edge 26 are substantially perpendicular to one another. Diverter 20 also includes an arcuate downward facing surface 28 as shown in FIG. 3 for diverting the vortex flow of molten metal in a downward direction as indicated by arrow BB. Arrow CC in FIG. 3 indicates the general direction at which metal particles enter charge well C.

Figure 4:
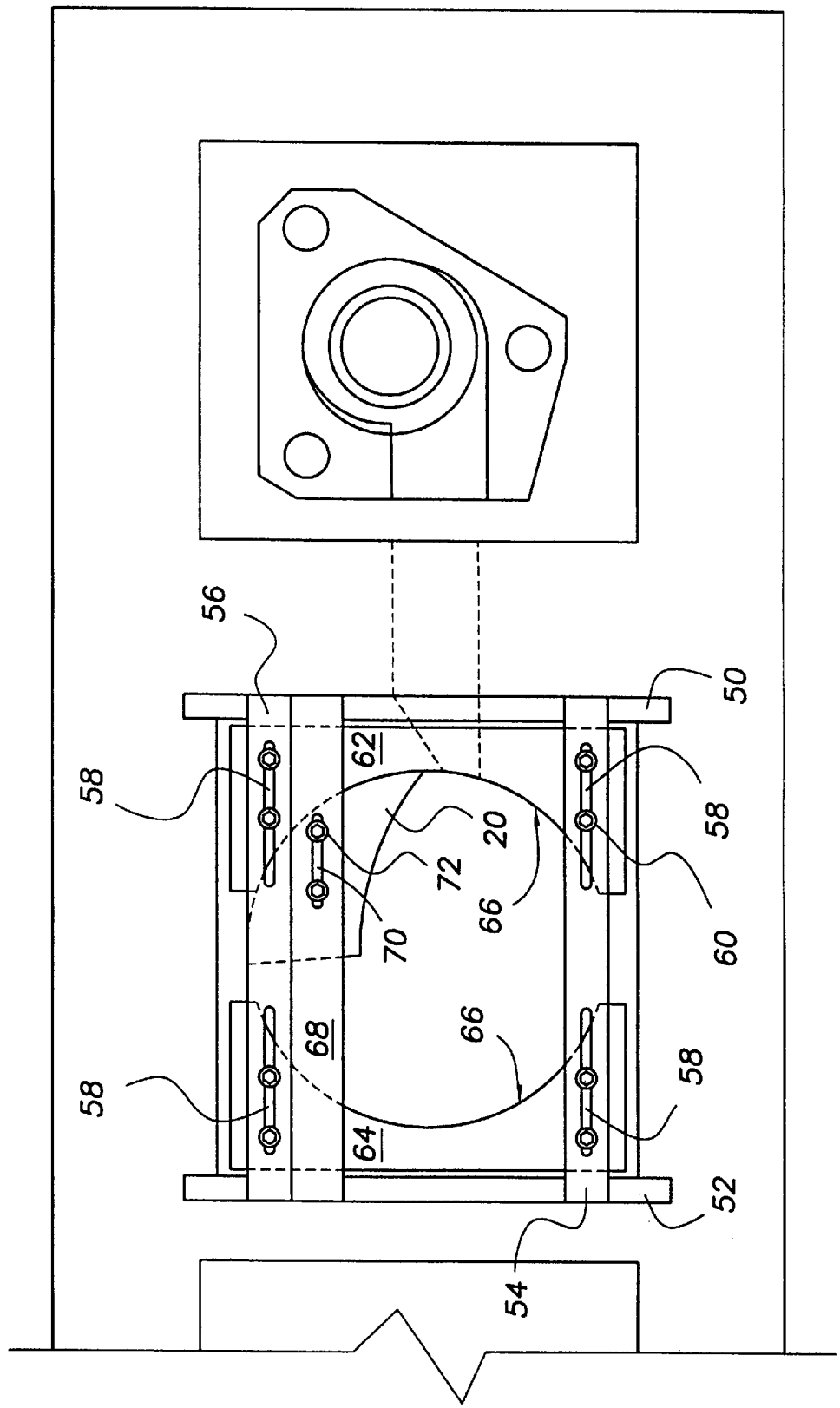
FIG. 4 illustrates a mounting configuration for a diverter according to the present invention.

Referring to FIG. 4, the mounting details for a diverter according to the present invention include a pair of cross members 50 and 52, which may be constructed from 4-inch by 4-inch square tubing. Welded to cross members 50 and 52 are main support members 54 and 56 which are provided with a pair of slots 58 therein. Slots 58 receive studs 60 which are affixed to the charge well inserts 62 and 64 which each comprise a thick wall of refractory material with an arcuate surface 66 thereon. Also bolted to cross members 50 and 52 is diverter support bracket 68 which is provided with a slot 70 for receiving studs 72 that are attached to diverter 20. In this way, diverter 20 is suspended within the charge well from diverter support bracket 68.

Figure 5A:
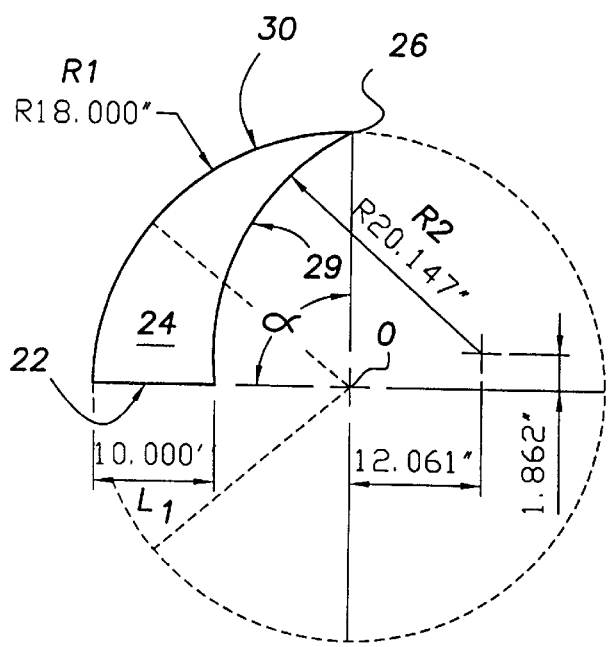
FIG. 5A, FIG. 5B and FIG. 5C show top, side and front views, respectively, of a diverter according to the present invention.
Figure 5B:
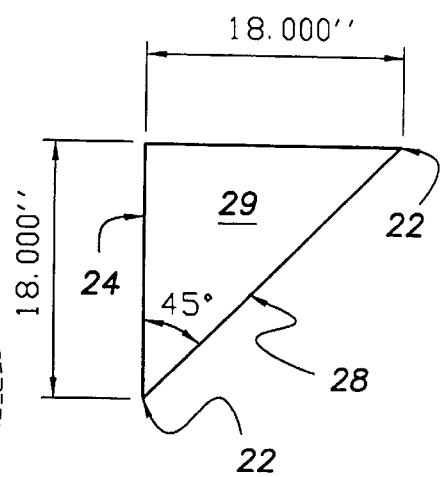

Referring to FIGS. 5A and 5B, a diverter according to a preferred embodiment of the present invention may be constructed with exterior side surface 30 having an outer radius R1 of 18.000 inches, which corresponds to the radius of the charge well, thus permitting the diverter to be flush mounted with the charge well wall. Leading edge 22 may be constructed with a length L1 of 10.000 inches. The top surface 24 is provided with an inner radius R2 of 20.147 inches, measured from a point that is disposed from the origin O a distance of 12.01 inches in the x-direction and 1.862 inches in the y-direction. Inner radius R2 partly defines an interior side surface 29. Referring to FIG. 5B, which is a side view in a direction from the right side of FIG. 5A, downward facing surface 28 is provided at an angle of approximately 45 degrees and trailing edge 26 is provided with a length L2 of 18.000 inches. Referring again to FIG. 5A, it can be seen that exterior side surface 30 is an arcuate surface extending from leading edge 22 to trailing edge 26 and that leading edge 22 extends along a radial line from point O, which corresponds to the center of the charge well. It can also be seen that trailing edge 26 intersects a radial line from point O. These radial lines define an angle ALPHA which is 90 degrees. Thus, arcuate exterior side surface 30 subtends angle ALPHA. It will be understood that ALPHA need not be 90 degrees as shown in FIG. 5A, but may be varied, preferably between 60 and 150 degrees, as suggested by the diverter embodiment shown in FIG. 4, to achieve variable flow characteristics.

Figure 5C:
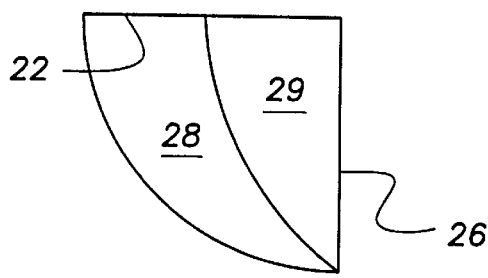

Referring to FIG. 5C, which is a front view in a direction from below FIG. 5A, the shape of diverting surface 28 and interior side surface 29 are shown.

As will be apparent to those of ordinary skill, the presence of diverter 20 facilitates the quick and efficient introduction of metal particles into charge well C. Facile submergence and high feed rates of incoming scrap metal are accomplished with the use of the diverter according to the present invention. The present invention also provides a calm surface on the molten metal bath for minimization of dross formations in molten aluminum applications.

While the invention has been described in detail with reference to a preferred embodiment thereof, it will be apparent to one skilled in the art that various changes can be made, and equivalents employed without departing from the spirit and scope of the invention. For example, although the diverter has been described in one embodiment as being mounted within the charge well on a support structure, it will be recognized that the diverter may be formed as an integral or homogenous structure with other elements of the charge well, such as the charge well inserts, which are primarily constructed of refractory material.

What is claimed is:

1. A charge well for melting scrap metal pieces into a molten metal bath comprising:
    a receptacle for containing the molten metal;
    an inlet for ingress of molten metal to the receptacle, said inlet being situated to cause a circular flow of molten metal within the receptacle;
    an outlet for egress of molten metal from the receptacle; and
    a diverter within the receptacle for directing the circular flow of molten metal in a downward direction to thereby facilitate the submergence of the scrap metal, wherein a cross-sectional view of said charge well at the vertical height of said diverter is non-circular.

2. The charge well of claim 1, wherein the diverter comprises a generally wedge-shaped body having an arcuate downward facing surface.

3. The charge well of claim 1, wherein the diverter comprises a generally planar top surface having a relatively wide leading edge which tapers to a narrow trailing edge.

4. The charge well of claim 3, wherein the leading edge of the diverter is located 270 degrees from the inlet.

5. The charge well of claim 3, wherein the leading edge extends generally perpendicular to the trailing edge.

6. The charge well of claim 1, further comprising a diverter support bracket mounted above the receptacle for securing the diverter thereto.

7. The charge well of claim 1, wherein the receptacle is bowl-shaped and the diverter is provided with an outside radius that permits flush mounting of the diverter to the receptacle wall.

8. An apparatus for melting scrap metal pieces into a molten metal bath comprising:

a furnace for providing and storing molten metal;

a charge well in fluid communication with the furnace;

a molten metal pump for pumping molten metal from the furnace to the charge well;

the charge well including:
   a receptacle for containing the molten metal,
   an inlet conduit for ingress of molten metal to the receptacle, said inlet conduit being situated to cause a circular flow of molten metal within the receptacle,
   an outlet port for egress of molten metal from the receptacle; and
   a diverter within the receptacle for directing the circular flow of molten metal in a downward direction to thereby facilitate the submergence of the scrap metal.

9. The apparatus of claim 8, wherein the diverter comprises a generally wedge-shaped body having an arcuate downward facing surface.

10. The apparatus of claim 9, wherein the diverter comprises a generally planar top surface having a relatively wide leading edge which tapers to a narrow trailing edge.

11. The apparatus of claim 10, wherein the leading edge of the diverter is located 270 degrees from the inlet conduit.

12. The apparatus of claim 10, wherein the leading edge extends generally orthogonally to the trailing edge.

13. The apparatus of claim 8, further comprising a diverter support bracket mounted above the receptacle for securing the diverter thereto.

14. The apparatus of claim 8, wherein the receptacle is bowl-shaped and the diverter is provided with an outside radius that permits flush mounting of the diverter to the receptacle wall.

15. A diverter for creating a downward flow in a charge well for melting scrap metal comprising:

a generally wedge-shaped body having a top, generally planar, surface and a relatively wide leading edge tapering to a narrower trailing surface or edge, the trailing surface or edge extending substantially orthogonally to the top planar surface;

a downward facing surface extending from the leading edge for directing the flow downward.

16. The diverter of claim 15, wherein said downward facing surface forms an angle of less than 90 degrees with said top planar surface.

17. The diverter of claim 16, wherein said downward facing surface is a planar surface.

18. The diverter of claim 16, wherein said downward facing surface is a concave or convex surface.

19. The diverter of claim 16, wherein said diverter has an arcuate exterior side surface extending between said leading edge and said trailing edge, said arcuate exterior side surface subtending an angle between 60 and 150 degrees.

20. The diverter of claim 15, further comprised of a refractory material.

21. A method of melting scrap metal comprising the steps of:

a) providing a charge well having an inlet for providing a generally circular flow of molten metal therein and an outlet for egress of the molten metal;

b) causing the circular flow in the charge well to flow in a downward direction using a stationary diverter;

c) introducing the scrap metal into the molten metal flow such that the downward flow results in the submergence of the scrap metal in the molten metal.

22. A diverter for creating a downward flow in a charge well for melting scrap metal comprising:

a generally wedge-shaped body having a top surface and a relatively wide leading edge tapering to a narrower trailing surface or edge, the trailing surface or edge being substantially perpendicular leading edge;

a downward facing surface extending from the leading edge, forming an angle of less than 90 degrees with said top surface, for directing the flow downward.

* * * * *